(12) United States Patent
Delourme et al.

(10) Patent No.: US 9,709,233 B2
(45) Date of Patent: Jul. 18, 2017

(54) MODULAR VEHICLE LIGHT DEVICE

(71) Applicant: VALEO VISION BELGIQUE, Meslin l'Eveque (BE)

(72) Inventors: Jean-Francois Delourme, Meslin l'Eveque (BE); Marianne Gons, Meslin l'Eveque (BE)

(73) Assignee: Valeo Vision Belgique, Meslin l'Eveque (BE)

( * ) Notice: Subject to any disclaimer, the term of this patent is extended or adjusted under 35 U.S.C. 154(b) by 145 days.

(21) Appl. No.: 14/603,852

(22) Filed: Jan. 23, 2015

(65) Prior Publication Data

US 2015/0211702 A1 Jul. 30, 2015

(30) Foreign Application Priority Data

Jan. 24, 2014 (FR) ...................... 14 50630

(51) Int. Cl.
| | |
|---|---|
| *F21S 8/10* | (2006.01) |
| *F21V 17/10* | (2006.01) |
| *B60Q 1/30* | (2006.01) |
| *F21W 101/14* | (2006.01) |
| *F21W 101/00* | (2006.01) |

(52) U.S. Cl.
CPC .............. *F21S 48/00* (2013.01); *B60Q 1/302* (2013.01); *F21S 48/218* (2013.01); *F21S 48/2212* (2013.01); *F21V 17/107* (2013.01); *B60Q 2400/30* (2013.01); *F21W 2101/00* (2013.01);
(Continued)

(58) Field of Classification Search
CPC ........ B60Q 1/302; B60Q 1/05; B60Q 1/0458; B60Q 1/2692; B60Q 1/52; B60Q 7/00; B60Q 7/02; B60Q 2400/30; F21S 48/00; F21S 48/218; F21S 48/2212; F21S 48/1208; F21S 48/1225; F21S 48/123; F21S 4/20; F21S 4/28; F21S 2/00; F21S 2/005; F21S 48/1233; F21W 2101/00; F21W 2101/02; F21W 2101/14; F21V 17/107; Y10T 403/32254; Y10T 403/32319; Y10T 403/32377; Y10T 403/32385; Y10T 403/32393; Y10T 403/32401; Y10T 403/32409
See application file for complete search history.

(56) References Cited

U.S. PATENT DOCUMENTS

| | | | |
|---|---|---|---|
| 4,707,766 A | 11/1987 | Bertozzi et al. | |
| 4,825,191 A | * 4/1989 | Ching-Hwei | ............ B60Q 7/00 340/472 |

(Continued)

FOREIGN PATENT DOCUMENTS

| | | |
|---|---|---|
| DE | 9411780 U1 | 9/1994 |
| FR | 2790541 A1 | 9/2000 |

(Continued)

*Primary Examiner* — Alan Cariaso
(74) *Attorney, Agent, or Firm* — Jacox, Meckstroth & Jenkins

(57) ABSTRACT

A vehicle light device comprising an element made up of a plurality of portions each having a functional surface, at least two consecutive portions being linked together by an articulation. The main feature of a light device according to the invention is that each articulation allows the displacement of the two consecutive portions until their functional surfaces come into continuity with one another.

19 Claims, 2 Drawing Sheets

(52) U.S. Cl.
CPC .. *F21W 2101/14* (2013.01); *Y10T 403/32401* (2015.01); *Y10T 403/32409* (2015.01)

(56) References Cited

U.S. PATENT DOCUMENTS

| | | | | | |
|---|---|---|---|---|---|
| 4,920,330 | A | * | 4/1990 | Plozner | B60Q 1/302 200/61.45 R |
| 5,050,051 | A | * | 9/1991 | MacHida | B60Q 1/302 362/268 |
| 5,558,427 | A | * | 9/1996 | Yang | B60Q 7/00 362/396 |
| 6,683,532 | B2 | * | 1/2004 | Peet, II | B60Q 7/00 116/63 R |
| 7,025,485 | B2 | * | 4/2006 | Henry | B60Q 1/302 362/249.02 |
| 7,036,965 | B2 | | 5/2006 | Dalton, Jr. et al. | |
| 8,130,156 | B2 | * | 3/2012 | Kittinger | B60Q 1/0017 343/713 |
| 8,167,512 | B2 | * | 5/2012 | Christensen | E01F 13/022 256/13.1 |
| 8,864,347 | B2 | * | 10/2014 | Pearson | F21S 2/005 362/362 |
| 9,205,774 | B2 | * | 12/2015 | Kennemer | F21L 14/00 |
| 2004/0208013 | A1 | | 10/2004 | Dalton, Jr. et al. | |
| 2006/0187670 | A1 | | 8/2006 | Dalton, Jr. et al. | |
| 2009/0168422 | A1 | * | 7/2009 | Chiu | F21S 2/005 362/249.03 |
| 2010/0271804 | A1 | | 10/2010 | Levine | |
| 2013/0265755 | A1 | | 10/2013 | Adams | |
| 2013/0272000 | A1 | | 10/2013 | Pearson et al. | |

FOREIGN PATENT DOCUMENTS

| | | |
|---|---|---|
| GB | 2215450 A | 9/1989 |
| WO | 2013174929 A1 | 11/2013 |

\* cited by examiner

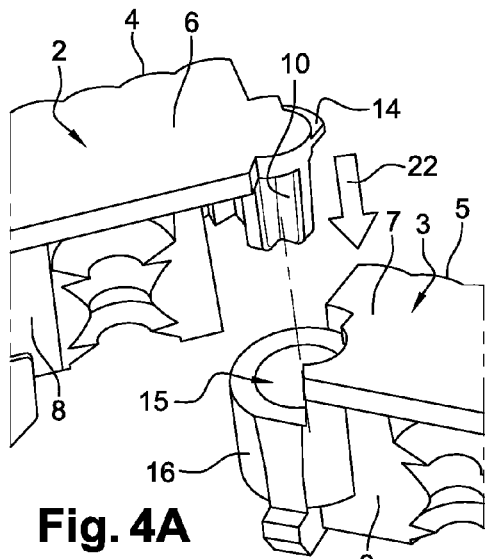
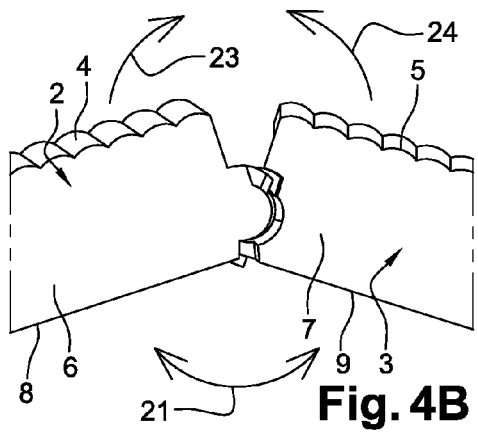
Fig. 4A
Fig. 4B
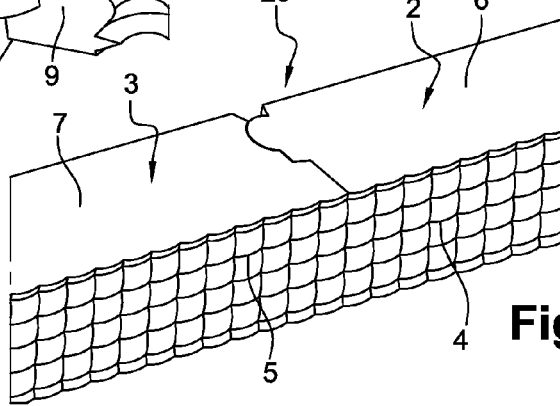
Fig. 4C
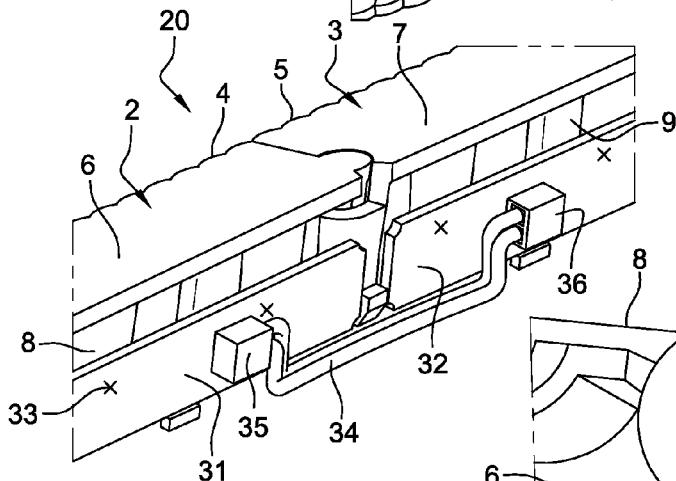
Fig. 5
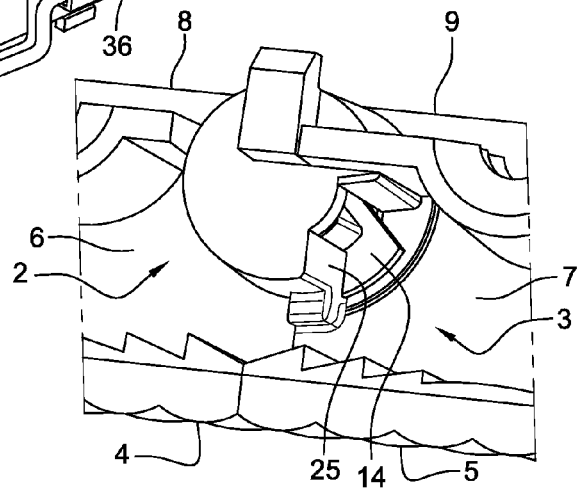
Fig. 6

MODULAR VEHICLE LIGHT DEVICE

CROSS-REFERENCE TO RELATED APPLICATIONS

This application claims priority to French Application No. 1450630 filed Jan. 24, 2014, which application is incorporated herein by reference and made a part hereof.

BACKGROUND OF THE INVENTION

1. Field of the Invention

A modular vehicle light device. Such a light device can, for example, be used as a lighting or signaling light. It can also be used, for example, as a stoplight, to signal to a driver located behind the vehicle a braking phase of the vehicle. The term "modular" means that the light device can be made available in a plurality of versions, linked to its dimensions.

2. Description of the Related Art

Light devices in a plurality of portions exist, and have already been the subject of patents. The patent FR2790541 can, for example, be cited, which relates to a light device such as a signaling light, and which can be produced in a plurality of sections of translucent plate. These various sections are connected together by rebating, which is one fixing method likely to create plays between the different sections. Now, such plays present the drawback of being able to locally influence the trajectory of the light beams emitted by the device, and of being able to embrittle the mechanical strength of the device. Furthermore, such plays can also degrade the appearance of the device and therefore that of the vehicle.

SUMMARY OF THE INVENTION

The vehicle light devices according to the invention are produced in at least two portions, and overcome the main drawbacks noted in the prior art.

The subject of the invention is a vehicle light device comprising an element made up of a plurality of portions each having a functional surface, at least two consecutive portions being linked together by an articulation.

The main feature of a light device according to the invention is that each articulation allows the displacement of the two consecutive portions, until their functional surfaces come into continuity with one another. Through an alignment of the functional surfaces of the portions forming the element of the light device, the element will be able to ensure its function within the light device, with the same accuracy and with the same precision as if it were of a single piece. The term "in continuity" means that the two consecutive portions will not induce any play between them, likely to introduce a visible separation between their functional surfaces. By being produced in at least two portions, such an element can have very large dimensions. In effect, an element of the desired size can be obtained by simply adding the number of necessary portions.

To sum up, by producing an element in at least two portions having their functional surfaces in perfect continuity with one another, it is possible to obtain two major technical effects:

the element of the light device can be of variable size, depending on the number and the size of the portions of which it is made. This element can thus provide a multiplicity of functions in a vehicle, a possibility of obtaining an element of large size that has the properties sought. In effect, the techniques that are usually used do not make it possible to manufacture one-piece elements of large size, because they would require molds of excessively large dimensions and/or premature wear of the tools, such as milling machines, that would have to be renewed during the process.

According to one embodiment of the invention, the two consecutive portions are displaced until their functional surfaces become tangential to one another.

According to one embodiment of the invention, the relative displacement between the two consecutive portions cannot be extended beyond a threshold position for which the functional surfaces are aligned. The displacement of each portion can be performed, either by rotation, or by translation, or by a combination of these two movements.

According to one embodiment of the invention, the two consecutive portions are mounted to rotate, that is to say that the consecutive portions, once mounted, are free to rotate. In one example, the rotation between the two consecutive portions cannot be extended beyond a threshold position for which the functional surfaces are aligned. According to a nonlimiting example, a mechanical abutment can advantageously block the rotational movement of the two consecutive portions. For example, the abutment can be made directly on the flank of the two consecutive portions.

Preferentially, the two consecutive portions are elongate and are arranged relative to one another in such a way that their longitudinal axes are parallel, and in such a way that both the two consecutive portions are in continuity with one another. For this configuration, the final element has rather a tapered geometry.

Preferentially, each articulation is produced by means of the penetration of a pin belonging to one of the two consecutive portions, into a void of the other adjacent consecutive portion. According to one embodiment of the invention, the pin is molded with the rest of the portion. This is a simplified configuration, because it does not implement an added hinge requiring the use of particular fixing means and appropriate tools.

Advantageously, the penetration of the pin into the void can be produced only for a given relative position between the two consecutive portions, and for which the consecutive portions form a predetermined angle between them. In effect, the pin and the void have complementary profiles only for a given angular position between the two consecutive portions involved. In other words, the pin and the void have asymmetrical geometries, which actually match only for a given relative position between the two consecutive portions. For all the other positions, the bored section of the void is smaller than the cross section of the pin, thus preventing the penetration of the pin into the void.

According to one embodiment of the invention, the predetermined angle is between 90° and 160°. In this way, the handling of the two consecutive portions to allow their functional surfaces to be in continuity becomes easy and well controlled.

Preferentially, the pin is placed at one end of a consecutive portion and the void is placed at one end of the other consecutive portion, which is adjacent to it. Thus, when the element is in a configuration for which the functional surfaces of the two consecutive portions are in continuity with one another, the portions do not overlap. The length of the element then corresponds to the sum of the lengths of its constituent portions.

Preferentially, the element is obtained by means of a first translational movement to allow the penetration of the pin into the void, then by a second rotational movement about the pin. In this way, the penetration of the pin into the void makes it possible to link together the two consecutive portions, and the rotation of the portions makes it possible to bring their functional surfaces into continuity with one another. By virtue of these two movement components between two consecutive portions, the functional surfaces are brought into continuity with one another, reliably and in a controlled manner. According to one embodiment of the invention, the second rotational movement about the pin is made until the functional surfaces of the parts are brought flush, notably for them to become tangential relative to one another.

Advantageously, the element is an optical element. An optical element can, for example, consist of a reflecting mirror or a wall intended to be passed through by light rays, notably a translucent or transparent wall.

According to one embodiment of the invention, each portion consists of a Fresnel module. The Fresnel module can comprise Fresnel mirrors suitable for reflecting the light. Alternatively, the Fresnel module can comprise Fresnel lenses suitable for transmitting the light.

Preferentially, the functional surface is a diopter suitable for being passed through by light rays. It is important for the element to have a resulting diopter that is uniform, involving a quasi-perfect alignment of the diopters of the portions of the element.

Preferentially, the device comprises a plurality of light sources distributed along the optical element and intended to light the functional surface. According to one embodiment of the invention, the light sources are evenly distributed along the optical element, in such a way that the resulting functional surface of the element is lit uniformly. For example, the light sources can be distributed equidistantly from one another.

Advantageously, each portion comprises a printed circuit board.

According to one embodiment of the invention, the boards are electrically connected together.

Preferentially, the printed circuit boards comprise light sources.

Preferentially, the light sources are light-emitting diodes.

Advantageously, the two consecutive portions of the element are held in a position for which their functional surfaces are in continuity with one another, via at least one mechanical locking member situated at the level of the articulation. Since the light device is intended to be installed in a vehicle, it will notably undergo vibrations inherent to the operation of the vehicle. It is therefore necessary to hold the element in a functional position, without the risk of having its constituent portions displaced under the effect of the vibrations. Preferentially, the locking member is a part that can be implemented by rotation or by sliding to fix the relative position of the two consecutive portions of the element.

According to one embodiment of the invention, each locking member consists of a clip. A clip is a locking system that is quick and simple to implement, and which offers good reliability.

According to one embodiment of the invention, each locking member consists of a clamp. For example, each consecutive portion can comprise at least one ridge or at least one protruding tab. The ribs or the tabs of each consecutive portion converge or come into contact at the end of displacement of the two portions, then the clamp grips the ribs or the tabs of the two consecutive portions.

According to one embodiment of the invention, each locking member consists of a bar. For example, each consecutive portion can comprise at least one hook, the hook being able to be an element with "U"- or "L"-shaped section. At the end of displacement of the two portions, the bar is placed in the hooks of at least two consecutive portions.

Preferentially, the light device according to the invention comprises a support housing, the constituent portions of the element being fixed in the housing, when they are linked together in a position for which their functional surfaces are in continuity. According to one embodiment of the invention, this housing consists of at least one wall. This housing has a dual function: on the one hand, it protects the element of the light device, and, on the other hand, it serves as an anchoring support for the consecutive portions of the element, to prevent them from moving and therefore from moving away from their positions for which their functional surfaces are in continuity.

Preferentially, the consecutive portions are fixed in the housing by snap-fitting. Snap-fitting is a fixing means that is simple and quick to use, and that offers a good level of reliability.

A second subject of the invention is a method for mounting a light device according to the invention.

The main feature of a method according to the invention is that it comprises the following steps:
  a step of translationally fitting a first portion into a second adjacent portion, each comprising a functional surface, the portions forming a predetermined angle between them to produce the fitting,
  a step of rotating the portions so as to bring the functional surfaces into continuity.

In this way, the fitting step makes it possible to link two consecutive portions together, and the rotation step makes it possible to align the functional surface of the portions.

According to one embodiment of the invention, the method further comprises a step of locking the consecutive portions in a position for which their functional surfaces are in continuity with one another. It is important for the consecutive portions of the element of the light device not to have a position that fluctuates, under the effect of stresses such as, for example, vibrations, otherwise the device may be made inoperative.

A third subject of the invention is a vehicle signaling light comprising a light device according to the invention.

A fourth subject of the invention is a vehicle interior lighting light comprising a light device according to the invention.

A fifth subject of the invention is a headlight of a vehicle comprising a light device according to the invention, notably comprising a daytime running light, also called DRL.

A vehicle light device according to the invention offers the advantage of being modular dependent on the number and the size of the portions of which it is composed. It can therefore be manufactured to order, to meet a specific lighting or signaling need in a vehicle. It further has the advantage of being able to be of large size, in order, for example, to provide a spread stoplight function in the vehicle interior, a facility that cannot be provided with the current manufacturing techniques. Finally, it offers the advantage of being of a constant cost relative to an existing light device and fulfilling the same function, because it is implemented by means of a small number of parts manufactured conventionally by molding.

These and other objects and advantages of the invention will be apparent from the following description, the accompanying drawings and the appended claims.

A detailed description of a preferred embodiment of a light device according to the invention is given hereinbelow, with reference to FIGS. 1 to 6.

BRIEF DESCRIPTION OF THE ACCOMPANYING DRAWINGS

FIG. 4A is a perspective view of two portions of an element of a light device according to the invention, in a first phase of a method of joining the portions;

FIG. 4B is a perspective view of the two portions of FIG. 4A, in a second phase of joining the portions;

FIG. 4C is a perspective view of the two portions of FIGS. 4A and 4B, in a final phase of joining the portions;

FIG. 5 is a perspective view from a first angle of a link area between two portions of an element of a light device according to the invention, the element being mounted; and FIG. 6 is a perspective view from a second angle of a link area between two portions of an element of a light device according to the invention, the element being mounted.

DETAILED DESCRIPTION OF THE PREFERRED EMBODIMENTS

Figure 1:
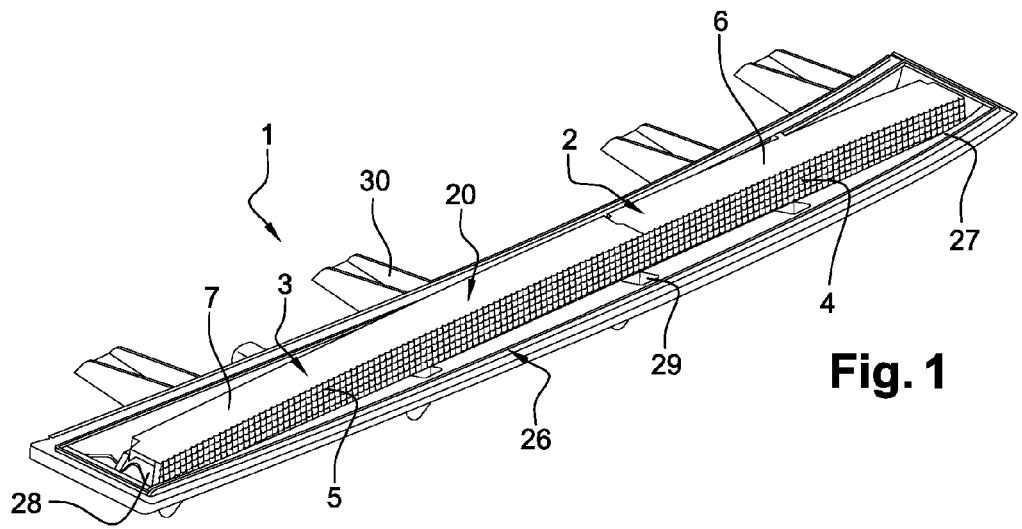
FIG. 1 is a perspective view of a light device according to the invention.

Referring to FIG. 1, a light device 1 according to the invention can, for example, consist of a signaling light of raised stoplight type, placed at the rear of the interior of a vehicle. Such a stoplight 1 has the structural peculiarity of being extended along a transverse axis of the vehicle, over a length that can correspond to more than half of the width of the vehicle. Such a stoplight 1 is also known by the acronym CHMSL (Centered High Mounted Stop Lamp).

A stoplight 1 according to the invention has an optical element 20 produced in two portions 2, 3 each comprising a functional surface 4, 5, the portions 2, 3 being linked to one another so that the functional surfaces 4, 5 are perfectly aligned with one another, without leaving the slightest play between them. Each of the portions 2, 3 consists of a Fresnel module, and each functional surface 4, 5 is a diopter suitable for being passed through by light rays. The term "surface" should be interpreted as "wall". Each diopter 4, 5 therefore consists of a substantially planar wall, having a multiplicity of domed individual reliefs, so as to produce light spots when this diopter 4, 5 is lit by a light source. Each portion 2, 3 is elongate and is of tapered form.

A diopter 4, 5 is extended at one of its elongate edges by a planar secondary wall 6, 7, the length of which is substantially equivalent to that of the diopter 4, 5. This secondary wall 6, 7 is at right angles to the diopter 4, 5 and is itself extended by a rear surface 8, 9, which is substantially parallel to the diopter 4, 5. Thus, each portion 2, 3 comprises a front surface consisting of the diopter 4, 5, a rear surface 8, 9 which is parallel to the diopter 4, 5, the surfaces 4, 5, 8, 9 being linked by a secondary wall 6, 7 which is at right angles to them.

Referring to FIG. 5, each portion 2, 3 is equipped with a printed circuit board 31, 32, placed on the rear face 8, 9. Each board 31, 32 is rectangular, and extends substantially over the entire length of a portion 2, 3, such that the longitudinal axis of the board 31, 32 is parallel to the longitudinal axis of the portion 2, 3 to which it is fixed. Each board 31, 32 comprises a plurality of light sources 33 in the form of light-emitting diodes, evenly distributed along its longitudinal axis. The light-emitting diodes 33 placed on the rear face of each portion 2, 3 thus light the diopters 4, 5 placed on the front face of each of the portions 2, 3.

Figure 2:
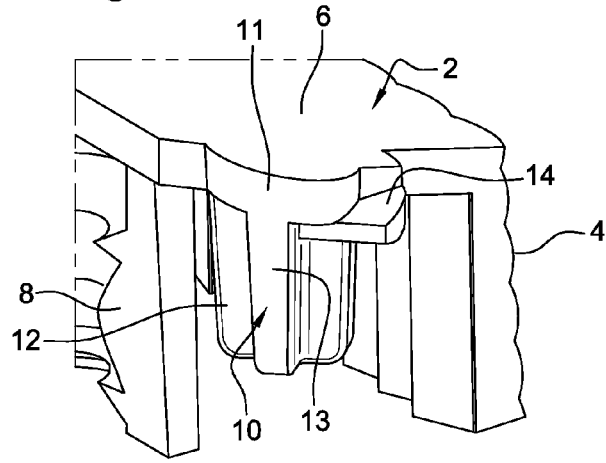
FIG. 2 is a perspective view of one end of one of the portions of an element of a light device according to the invention, the end being provided with a pin.

Referring to FIG. 2, one portion 2 of the two portions 2, 3 comprises a pin 10 starting from the secondary wall 6 and extending inside the portion 2, parallel to the front 4 and rear 8 faces. In this way, the pin 10 is located in the space delimited by the front 4 and rear 8 walls, and by the secondary wall 6. This pin 10 has a base 11 from which emerges an elongate body 12 having at least one protruding rib 13 extending along a longitudinal axis of the pin 10. A collar 14 is inserted between the base 11 and the body 12, the collar 14 being planar and of small thickness. This collar 14 extends partially around the body 12 of the pin 10, over a limited angular segment, less than 90°. This collar 14 is placed at right angles to the longitudinal axis of the pin 10, and emerges from the base 11 of the pin 10.

Figure 3:
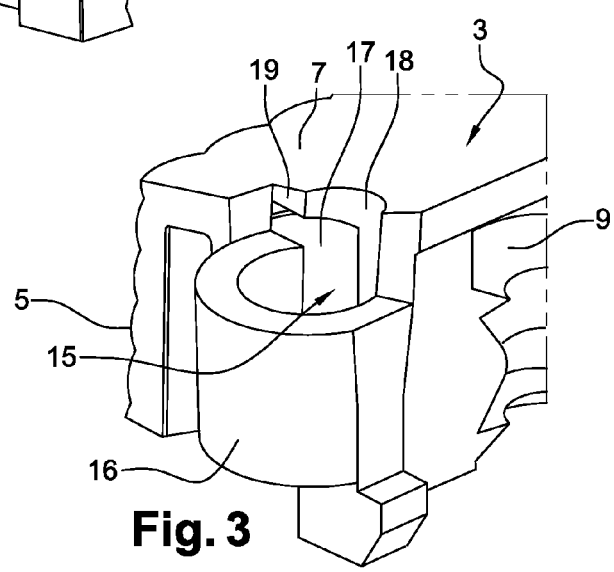
FIG. 3 is a perspective view of one end of one of the portions of an element of a light device according to the invention, the end being provided with a void intended to receive the pin of the portion illustrated in FIG. 2.

Referring to FIG. 3, the other portion 3, the one not comprising the pin 10, has, at one of its ends, considered relative to its longitudinal axis, a void 15 intended to receive the pin 10. The penetration of the pin 10 into the void 15 makes it possible to ensure that the portions 2, 3 are fitted together, in order to obtain the final optical element 20 of the stoplight 1. This void 15 is delimited by a partial cylindrical wall 16, of substantially constant length. This wall 16 extends over an angular segment slightly greater than 180°, and therefore leaves an opening 17 showing. In the extension of this opening 17, the secondary wall 7 of this portion 3 comprises notches 18, 19.

Referring to FIGS. 4A and 4B, the particular forms of the pin 10 and of the void 15 allow a penetration of the pin 10 into the void 15 only for a particular relative position between the two portions 2, 3 forming the optical element 20 of the stoplight 1. In effect, the portions 2, 3 have to form, between them, a very precise angle, as indicated by the arrow 21 of FIG. 4B, for the pin 10 to be able to penetrate into the void 15. This angle preferentially lies between 90° and 160°. The angular opening between the portions 2, 3, to perform the penetration of the pin 10 into the void 15, is dictated by the particular geometries of the pin 10 and of the void 15. In effect, the two portions 2, 3 must be positioned relative to one another, in such a way that the pin 10, provided with its rib 13 and its collar 14, is perfectly registered with the void 15 provided with its opening 17 and the two notches 18, 19.

Thus, referring to FIGS. 4A, 4B and 4C, a method for mounting an optical element 20 of a stoplight 1 according to the invention involves the following main steps:

a step of relative positioning between the two portions 2, 3 as illustrated by FIG. 4A, so as to place the pin 10 and the void 15 in the extension of one another, a step of a first translational movement between the two portions 2, 3 in the direction indicated by the arrow 22 of FIG. 4A, so as to make the pin 10 of one portion 2 penetrate into the void 15 of the other portion 3, a step of a second rotational movement between the two portions 2, 3, once the pin 10 is housed in the void 15. This rotation is performed in the direction indicated by the two arrows 23, 24 of FIG. 4B, and its aim is to align the longitudinal axis of one portion 2, 3 with the longitudinal axis of the other portion 2, 3, as illustrated by FIG. 4C. By thus aligning the longitudinal axes of the two portions 2, 3, the diopters 4, 5 of the portions 2, 3 are in perfect continuity with one another, without introducing the slightest play between them, a step of locking together the portions 2, 3 in their aligned positions for which the diopters 4, 5 are in continuity. This step is illustrated in FIG. 6, and is performed at the end of travel, at the end of the rotation between the two portions 2, 3, by means of a snap-fitting involving the collar 14 of the pin 10 and a rectilinear edge 25 of the wall 16 delimiting the void 15. The object of this locking is to hold the two portions 2, 3 in an aligned position, without the possibility of reverse rotation. According to a variant embodiment, this locking can also be ensured by a link hook mounted to rotate on one of the two portions 2, 3, and which, through pivoting, clamps a receiving element of the other part 2, 3, provided for this purpose, a step of electrical connection between the two printed circuit boards 31, 32 by means of an electrical connection member 34 linking a terminal 35, 36 of each of the boards 31, 32, a step of mounting the aligned and locked portions 2, 3 in a support housing 26, consisting of a planar wall that is substantially rectangular and of small thickness. The assembly of the two portions 2, 3 is thus fixed to the housing 26 by snap-fitting, in two end areas 27, 28 and one central area 29 corresponding to the link area between the two portions 2, 3. This particular distribution of the points of anchoring of the two portions 2, 3 on the housing 26 makes it possible to ensure a robust and uniform fixing of the portions 2, 3, notably by balancing the forces produced in the fixing. This housing 26 comprises four fixing tabs 30 that are planar and of small thickness, evenly distributed along its longitudinal axis, the tabs 30 making it possible to moor the stoplight 1 at the rear of the interior of a motor vehicle. Said light 1 is thus located at height in the vehicle interior, in a position for which it extends horizontally, in a direction transversal to the vehicle.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A vehicle light device comprising an element made up of a plurality of portions each having a functional surface, at least two consecutive portions being linked together by an articulation, wherein each articulation allows the displacement of said at least two consecutive portions until their functional surfaces come into continuity with one another;
   wherein said at least two consecutive portions of said element are held in a position for which their functional surfaces are in continuity with one another, via at least one mechanical locking member situated at the articulation;
   wherein each of said at least two consecutive portions of said element are formed by a Fresnel module; and
   wherein said vehicle light device is a centered high mounted stop lamp (CHMSL) which extends horizontally in a transverse axis of a vehicle along a length corresponding to more than half of a width of said vehicle.

2. The vehicle light device according to claim 1, wherein said at least two consecutive portions are mounted to rotate.

3. The vehicle light device according to claim 1, wherein said at least two consecutive portions are elongate and are arranged relative to one another in such a way that their longitudinal axes are parallel and in such a way that both of said at least two consecutive portions are in continuity with one another.

4. The vehicle light device according to claim 3, wherein each articulation is produced by means of the penetration of a pin belonging to one of said at least two consecutive portions, into a void of the other adjacent consecutive portion.

5. The vehicle light device according claim 4, wherein the penetration of said pin into said void can be produced only for a given relative position between said at least two consecutive portions, and for which said at least two consecutive portions form a predetermined angle between them.

6. The vehicle light device according to claim 4, wherein said pin is placed at one end of one of said at least two consecutive portions and said void is placed at one end of the other adjacent consecutive portion.

7. The vehicle light device according to claim 4, wherein said element is obtained by means of a first translational movement to allow the penetration of said pin into said void, then by a second rotational movement about said pin.

8. The vehicle light device according to claim 1, wherein said element is an optical element.

9. The vehicle light device according to claim 8, wherein the functional surface is a diopter suitable for being passed through by light rays.

10. The vehicle light device according claim 9, wherein said vehicle light device comprises a plurality of light sources distributed along said optical element and intended to light said functional surface.

11. The vehicle light device according to claim 1, wherein each of said at least two consecutive portions comprises a printed circuit board.

12. The vehicle light device according to claim 11, wherein said printed circuit boards are electrically connected together.

13. The vehicle light device according to claim 11, wherein said printed circuit boards comprise light sources.

14. The vehicle light device according to claim 10, wherein said plurality of light sources are light-emitting diodes.

15. The vehicle light device according to claim 1, wherein the vehicle light device comprises a support housing, and in that said at least two consecutive portions of said element are fixed in said support housing, when said at least two consecutive portions are linked together in a position for which their functional surfaces are in continuity.

16. A method for mounting a light device according to claim 1, wherein the method comprises the following steps:
    a step of translationally fitting a first portion into a second adjacent portion, each comprising a functional surface, said first portion and said second adjacent portion forming a predetermined angle between them to produce said fitting; and
    a step of rotating said first portion and said second adjacent portion so as to bring said functional surfaces into continuity.

17. A vehicle signaling light comprising a light device according to claim 1.

18. A vehicle interior lighting light comprising a light device according to claim 1.

19. The vehicle light device according to claim 2, wherein said at least two consecutive portions are elongate and are arranged relative to one another in such a way that their longitudinal axes are parallel and in such a way that both of said at least two consecutive portions are in continuity with one another.

* * * * *